Figure 1:
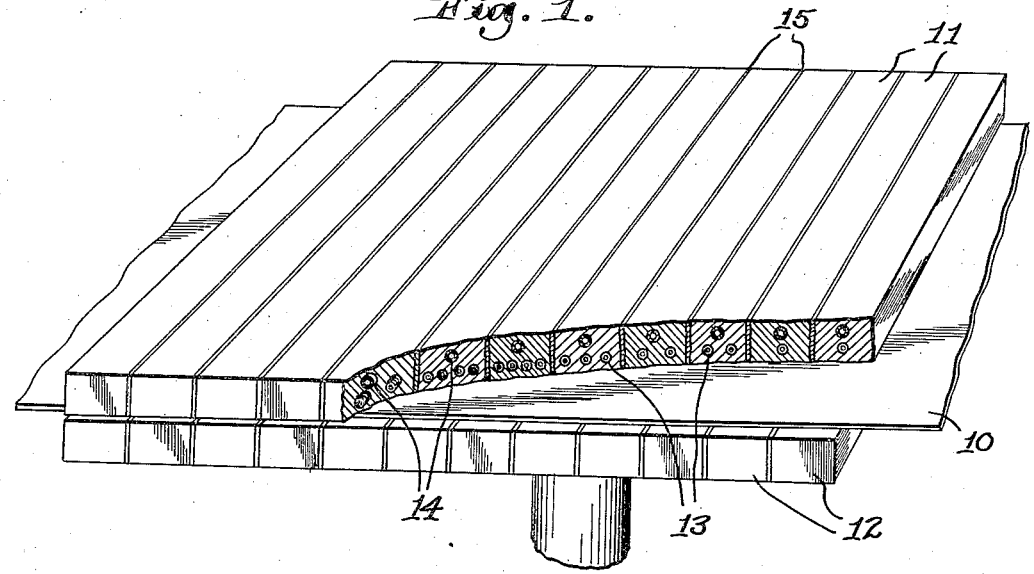

Jan. 3, 1939.       J. M. BIERER       2,142,971
PROCESS OF CURING ENDLESS BELTING
Filed Jan. 14, 1936       2 Sheets-Sheet 1

Inventor
John M. Bierer.
by Kenway & Witter
Attorneys

Jan. 3, 1939. J. M. BIERER 2,142,971
PROCESS OF CURING ENDLESS BELTING
Filed Jan. 14, 1936 2 Sheets-Sheet 2
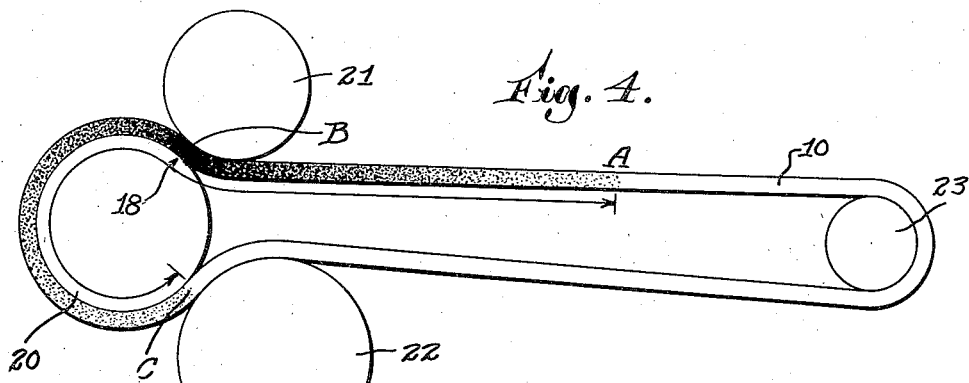
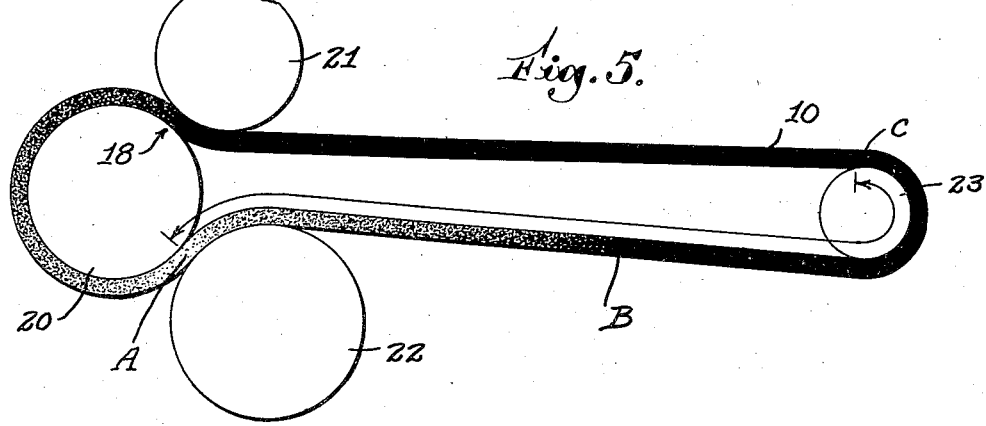
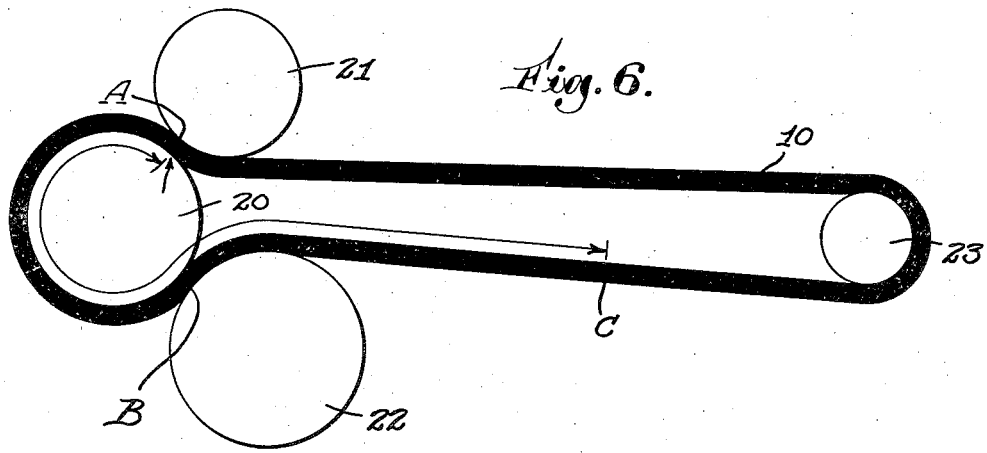
Inventor
John M. Bierer.
by Kenway & Witter
Attorneys Patented Jan. 3, 1939

2,142,971

UNITED STATES PATENT OFFICE 2,142,971

PROCESS OF CURING ENDLESS BELTING

John M. Bierer, Newton, Mass., assignor to Boston Woven Hose and Rubber Company, Cambridge, Mass., a corporation of Massachusetts Application January 14, 1936, Serial No. 59,078

13 Claims. (Cl. 18—53)

The present invention consists in a novel process of curing endless belting having rubber or other material in its composition which requires vulcanization or heat curing in producing the finished product.

For certain important industries it is desired to supply endless rubberized belting and heretofore it has been impossible to impart a uniform cure thereto or to rid the belting of the defects of non-uniform curing or of splicing. Endless belting as heretofore made has been cured between heated surfaces in a step-by-step manner which has necessitated an overlapping of the treated areas with resulting over-cured spots in the belting. In use these over-cured spots, or any areas which are denser or harder than the body of the belting show up as defects and wear out before the rest of the belt. Continuous vulcanizing machines have been used heretofore for imparting a uniform cure to belting that is not endless, but in such machines an end of the belting must be led to the heated vulcanizing surface and it is, of course, not possible to produce endless belting in this manner.

An inherent difficulty in continuously vulcanizing endless belting lies in the fact that once the belting is engaged with the heated surface or between cooperating curing surfaces before the application of heat, the problem arises of equal time exposure for all the parts of the belting in contact with the surfaces. This is further complicated by the fact that when uncured or partially cured belting has once been brought into contact with a heated curing surface it cannot be readily separated therefrom until it has been cured to a predetermined degree, that is to say, at least one-third cured. This problem is solved in accordance with the process of the present invention by first imparting to a section of endless belting a graduated cure decreasing lengthwise in both directions from an area of maximum or substantially complete cure and then introducing the belting, partially cured in this manner, into engagement with a heated surface and finally advancing the two in such a manner as to cause their separation approximately in the location determined by the point of first contact with the heated surface of the area of maximum cure in the precured section of the belting. In this way the trailing portion of the precured section is progressively brought up to a uniform degree of cure as it is moved to the point of separation, the area of least degree of cure in the section remaining in contact with the heated surface for the greater interval, and the portions of more complete degree of cure passing out of contact with the heated surfaces progressively after lesser intervals of time. The belting is maintained in motion until the leading end of the precured section is again progressively brought into contact with the heated surface and here again uniform curing results from the fact that the time of engagement of successive portions of the precured section varies inversely with the degree of cure of the same.

The present invention contemplates the employment of a heated vulcanizing cylinder for performing one step of the curing operation and, when so practiced, an endless belt is placed upon the heated cylinder in predetermined relation thereto; that is to say, the area of maximum cure in its precured section is arranged to correspond substantially to the point of tangency between the belting and the circumference of the cylinder. The cylinder is then rotated and the trailing end of the belting fed from the cylinder with the required time-contact relation. Subsequently the leading end of the precured belting is brought around into contact with the lead-in side of the cylinder and the advancing movement of the belt is terminated when the area of maximum cure reaches the point of tangency, in this manner bringing the initial graduated cure in this portion of the belt up to a condition of uniform cure.

Figure 2:
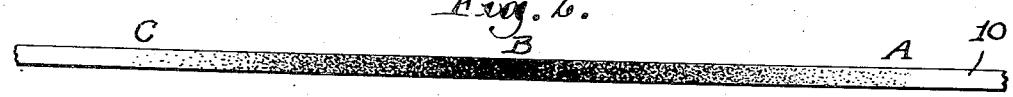
Figure 3:
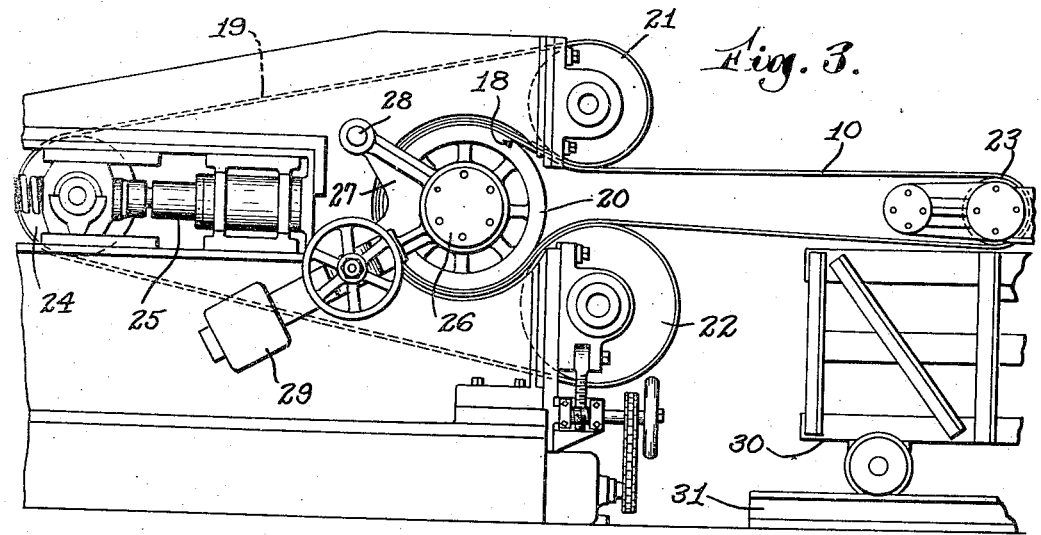

The features and advantages of the method will be best understood and appreciated from the following description of one manner in which it may be carried out as illustrated in the accompanying drawings in which, Fig. 1 is a view in perspective of cooperating vulcanizing plates suitable for use in effecting a graduated cure in a section of belting, Fig. 2 is a diagrammatic view indicating the condition of the precured section, Fig. 3 is a view in side elevation and on a small scale of portions of a vulcanizing machine suitable for carrying out the final steps of the process, and Figs. 4, 5 and 6 are diagrammatic views illustrating successive positions of the precured endless belt in the vulcanizing machine of Fig. 3.

As already explained the initial steps of my novel process may be carried out with the assistance of any apparatus suitable for imparting to a section of belting a graduated cure decreasing both ways longitudinally of the belting from an area of maximum cure. The maximum cure imparted to the belting in this initial step may be as much as a substantially complete cure or as little as substantially one-third cure. It is desirable to bring the area of maximum cure up to at least one-third complete cure because it is difficult to separate belting which is cured to a less degree than this from a heated curing surface, while belting cured at least one-third may be readily led off the surface of a heated drum, for example.

In Fig. 1 there is shown a pair of sectional vulcanizing plates 11 and 12 of similar construction and both consisting of a series of transversely disposed sections separated one from another by heat insulating material 15. Each of the sections is provided with one or more electric heating units 13 and with a single pipe 14 for cooling water. The central section of both plates 11 and 12 are each provided with four electric heating units and the number of these units gradually decreases both ways from the center, the endmost unit in each series having a single heating unit only. The purpose of this construction is to insure a graduated heat effect in the curing plates, least at the ends and a maximum in the central zone.

A portion of an endless belt 10 is shown in position between the plates 11 and 12. In practice this section of belting is treated liberally with talc or other dusting medium and subjected to pressure between the cool plates. Electric energy is then supplied to the heating coils 13 and the plates are raised to an adequate temperature to cure the interposed stock in the graduated manner indicated in Fig. 2. In this figure the degree of cure is graphically indicated by the blackness of the belting, the area B having imparted thereto a maximum degree of cure and this decreasing in both directions longitudinally of the belt to the points A and C. In other words out of the whole length of the endless belt, the section A—C has imparted to it a graduated cure of the character indicated. When this partial cure has been effected the electric current to the plate sections is cut off and cooling water circulated through the pipes 14, thus reducing the temperature of the plates 11 and 12 to a point at which they may be readily separated from the belting.

The remaining steps of the process may be carried out in such apparatus as that illustrated in Fig. 3. This comprises a vulcanizing cylinder 20 arranged to be heated and rotated at slow speed about a horizontal axis and to cooperate with a steel pressure band 19. In heating and subjecting an endless belt to pressure, the pressure band 19 passes about approximately 270° of the circumference of the cylinder 20, being guided in its path by heated pressure rollers 21 and 22 and maintained under pressure by an adjustable roller 24 mounted in horizontally movable bearings and urged at all times away from the cylinder 20 by an hydraulic piston 25. One of the bearings 26 for the cylinder shaft is mounted upon an arm 27 which is pivotally and slidably supported upon a shaft 28 and the bearing is counterbalanced by a weight 29. This construction permits the bearing 26 to be temporarily displaced so that the endless belt 10 may be looped over the cylinder 20. The outer end of the endless belt 20 is looped about an idle drum 23 journalled in a carriage 30, movably supported upon tracks 31 and adjustable toward and from the drum 20 in accordance with the length of the belting to be treated.

Having imparted a graduated cure to the section A—C of the belting, the latter may now be presented to the apparatus of Fig. 3 in the manner diagrammatically indicated in Fig. 4, that is to say, with the zone or area B of maximum cure located at the point of tangency 18 between the cylinder 20 and the leaving side of the belt 10. In this position of presentation the leading portion B—A of the precured belting extends away from the drum 30 while the trailing portion B—C of the precured section extends about the circumference of the drum 20 approximately to the point of tangency between the drum and the belt on its leading-in side.

Having located the endless belt with reference to the vulcanizing cylinder as indicated in Fig. 4 the cylinder 20 is now brought up to a vulcanizing heat by admitting steam to the interior and to heating units, not shown, which may be employed with advantage to heat the pressure band 19 where it extends about the circumference of the cylinder. Under some circumstances it may be practicable to loop the belting about an already heated cylinder and consequently the sequence of steps in this respect is of secondary importance only. After the cylinder has been heated in one manner or the other it is slowly rotated and the endless belt advanced in the direction of the arrow. In Fig. 5 the belt is shown as having been advanced sufficiently to carry the precured section entirely away from the cylinder 20, about the drum 23 and back until the leading end A of the precured section is located substantially at the leading-in point of tangency. As represented in Fig. 5 the belt now has had a uniform cure imparted to it from the point B back to the leaving point of tangency and the uncured belting in passing about the circumference of the cylinder 20 has had imparted to it a graduated cure, indicated by the increasing blackness of the section up to the point of tangency 18. In the description hitherto, it is assumed that the cure imparted to the belt in passing around substantially 270° of the circumference of the cylinder 20 is approximately the same as that imparted to the trailing half B—C of the section A—C by the precuring plates 11 and 12. It will be understood without further explanation that, as the cylinder is rotated, the progressively increasing factor of time-contact between the uncured or partly cured belt and the heated cylinder 20 imparts thereto a correspondingly graduated cure.

In Fig. 6 the belt is represented as having been advanced until the leading end A of the precured section has traveled about the circumference of the cylinder 20 and has reached the leading-out point of tangency 18. When this position has been reached, the degree of cure, not only throughout this portion of the belting, but throughout its entire length, has been brought up to uniform. If the time-contact factor and the degree of heat have been adjusted for effecting a complete cure, the cylinder 20 may now be cooled and the completed belting removed from the apparatus. If, however, this step of the process has been calculated to impart a one-third cure to the belt, the movement of the belt is continued for two more complete passes about the cylinder in which it is brought successively up to the stage of two-thirds cure and then finally fully cured by the same sequence of operations already described.

It will be understood that the apparatus herein illustrated is merely typical and that the process of my invention is not limited to this or to any specific form of apparatus.

Having thus described my invention, what I claim as new and desire to secure by Letters Patent of the United States, is:—

1. The process of curing endless belting, which includes the steps of imparting to a section thereof a graduated cure decreasing lengthwise in both directions from an area of substantially complete cure, engaging the belting under pressure against a heated surface up to said area of complete cure, running out the belting from such engagement and completely curing the same, and then running the leading portion of said section into engagement with the heated surface to impart a uniform cure thereto.

2. The process of curing endless belting, which includes the steps of first imparting to a section of the belting a graduated cure decreasing in both directions lengthwise of the belting from an area of substantially complete cure, engaging the belting under pressure against a heated cylinder with approximately one half of its precured section leading tangentially away from the cylinder and then moving the cylinder and belting to bring said leading part of the section into engagement with another part of the cylinder.

3. The process of uniformly curing endless belting, which includes the steps of first imparting to a section of the belting a graduated cure decreasing in both directions lengthwise of the belting from an area of substantially complete cure, looping the belting about a heated cylinder with a portion which includes one half of said precured section directed out of contact with the cylinder, and the rotating of the cylinder to feed the leading end of said section forwardly into engagement with the cylinder for further curing.

4. The process of uniformly curing endless belting, which includes the steps of first imparting to a section of the belting a graduated cure decreasing in both directions lengthwise of the belting from an area of complete cure, engaging the belting under pressure with a heated cylinder having a circumference greater than one-half the length of the precured section, leading the belting away from the cylinder beginning with said area of complete cure, and rotating the cylinder to feed the belting until the advancing end of the precured section is brought around to the point originally occupied upon the cylinder by said area of maximum cure.

5. The process of uniformly curing endless belting, which consists in imparting to a section of the belting a graduated cure decreasing in both directions lengthwise from an area of at least one-third cure, then locating the belting for movement in an endless path over and in contact with a heated surface, leading the belting away from said surface at substantially the point of maximum cure, and advancing the belting repeatedly about its path.

6. The process of uniformly curing endless belting, which includes the steps of first heating in a graduated manner and then cooling a section of the belting and thereby imparting thereto a cure decreasing in both directions from a maximum, engaging the belting under pressure with a heated cylinder having an area of vulcanizing contact substantially equal to one half the precured area of the belting, leading the belting away from the cylinder in the vicinity of maximum cure, and rotating the cylinder to feed the precured section out of contact therewith.

7. The process of curing endless belting which includes the steps of imparting to a section thereof a cure increasing in degree longitudinally of the belting to an area of maximum cure, placing said area in contact with a heated vulcanizing surface, moving the belting and surface longitudinally of the belting while holding the belting in contact with the surface, separating the belting from the surface, beginning with said area, progressively and continuously during such movement, and stopping the movement and cooling the vulcanizing surface with said area again in contact therewith.

8. The process of curing endless belting which includes the steps of imparting to a section thereof a graduated cure increasing in degree longitudinally of the belting to an area of complete cure, moving the belting longitudinally while holding it in contact with a moving heated surface, and separating the belting from said surface progressively and continuously beginning approximately at the location of first contact of said area of complete cure with the heated surface and continuing such movement until said area again comes into contact with said surface.

9. The process of curing endless belting, which includes the steps of imparting to a section only thereof a graduated cure decreasing lengthwise of the belting in both directions from an area of maximum cure, initially engaging a portion only of the belting, including a portion of said section, with a heated vulcanizing surface, continuously moving the belting in an endless path longitudinally under pressure against and with said surface, continuously separating the belting from the vulcanizing surface during such movement, beginning such separating at or rearwardly of said area of maximum cure, and continuing such movement until said area of maximum cure again reaches the vulcanizing surface.

10. The process of curing endless belting, which includes the steps of first imparting to a section only of the belting a graduated cure decreasing in both directions lengthwise of the belting from an area of maximum cure, engaging a portion of the belting, including a portion of said section trailing said area, under pressure with an arcuate section of a heated vulcanizing cylinder, rotating the cylinder together with the contacting belting while leading the belting away from the cylinder beginning substantially at said area, and continuing such movement until the belting has been given the desired cure.

11. The process of uniformly curing endless belting, which consists in imparting to a section of the belting a graduated cure decreasing in both directions lengthwise from an area of maximum cure, advancing the belting with a portion thereof in continuous contact with a heated surface at a rate of time-contact inversely proportional to the degree of cure which has been imparted to successive portions thereof, beginning substantially with the area of maximum cure in position to leave said surface, and continuing the advancing movement until the belting has been given the desired cure.

12. The process of curing endless belting, which includes the steps of engaging a section of the belting between cool plates, heating the plates in a graduated manner to impart to said section a cure decreasing lengthwise in both directions from a maximum, cooling the plates, removing the partially cured belting therefrom, advancing the belting, beginning substantially with the area of maximum cure, in continuous contact with a heated surface at a rate of time-contact inversely proportional to the degree of cure which has been imparted thereto, and continuing the advancing movement until the belting has been given the desired cure.

13. The process of curing endless belting, which consists in first imparting a precure of graduated degree longitudinally to a limited longitudinal section of the belting, and then moving the belting in an endless path with a portion thereof in continuous contact with a heated surface while continuously separating the belting from the heated surface beginning with the maximum precured portion of said section, and continuing such movement in such time-contacting relation as uniformly to cure said precured section and impart a uniform degree of cure to the previously untreated portions of the belting.

JOHN M. BIERER.